Patented May 14, 1940

2,200,949

UNITED STATES PATENT OFFICE 2,200,949

MONAZO INTERMEDIATES

Miles Augustinus Dahlen and Frithjof Zwilgmeyer, Wilmington, Del., assignors to E. I. du Pont de Nemours & Company, Wilmington, Del., a corporation of Delaware No Drawing. Application February 2, 1939, Serial No. 254,164

5 Claims. (Cl. 260—198)

This invention relates to monazo compounds, and especially to certain phenyl-azo-amino naphthols which are insoluble in water and are useful for preparing valuable insoluble monazo coupling components and other purposes.

It is an object of the invention to provide azo compounds which are especially useful for the preparation of certain acylamino naphthol azo phenyl compounds, the latter being valuable coupling components having affinity for cotton fibres and producing valuable dyeings when developed on the fibre with diazotized amino bases. Another object of the invention is to provide processes for preparing the novel compounds. Other objects of the invention will be apparent from the following description.

The compounds of the invention are prepared by diazotizing an aniline which is free from water solubilizing groups and coupling in acid medium with a 1-amino-5-, -6-, or -7-naphthol or with a 2-amino-6, -7- or -8-naphthol. Commonly known methods of diazotization are used and the coupling is conducted in an acid medium which will cause coupling on the ring of the naphthol which is substituted by amino.

The compounds of the invention are represented in general by the formula

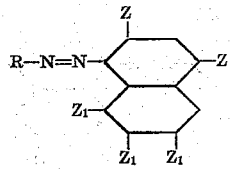

in which one Z is amino and the other is hydrogen, one $Z_1$ is hydroxy and the others are hydrogen, and R is the radical of a benzene compound which is mono substituted by amino and which is devoid of groups which make it soluble in water, but it may be substituted by other groups.

The invention will be more fully set forth in the following more detailed description which includes examples that are given as illustrative embodiments of the invention and not as limitations thereof.

Example 1

Meta-nitraniline (13.8 parts by weight) was diazotized in the usual manner. The solution of diazo salt was slowly added with stirring to a cold slightly acid solution of 17.5 parts of 1-amino-7-naphthol dissolved in hydrochloric acid. Before coupling the acid concentrations of the solutions were adjusted to give a reaction medium which was weakly acid to Congo red and then were cooled with ice to give a reaction medium which was about 0° C. to 5° C. The coupling was complete in a short time and an azo compound which is represented by the following formula was precipitated and separated in the usual manner

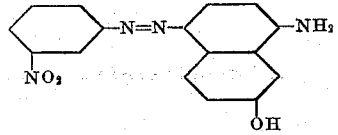

When separated and dried, this compound was a reddish brown powder insoluble in water, soluble in aqueous caustic soda solutions and having affinity for cotton fibres upon which it can be dyed and developed by applying diazotized amines. The compound can be acylated by heating a short time, say ten minutes at 120° C. with acetic anhydride. The acylated compound can then be used as a coupling component to make other developed dyeings having new shades and excellent improved properties.

Example 2

The same proportion of meta-nitraniline as in Example 1 was diazotized and coupled with 17.5 parts of 1-amino-6-naphthol by a method similar to that of Example 1. The dried compound was a reddish brown powder having other properties and uses similar to the compound of Example 1. The compound is represented by the formula

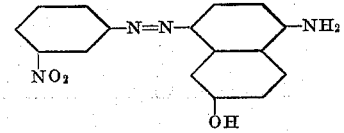

Similar results are obtained by coupling with 1,5-amino naphthol.

Example 3

The same molecular proportion of 5-nitro-2-amino anisole as used in Example 1 was diazotized and coupled with 17.5 parts of 1,7-amino naphthol by a process similar to that of Example 1.

The dried product was insoluble in water, soluble in aqueous caustic soda solutions and had affinity for cotton fibres. Similar to the compound of Example 1, the dyeings on cotton could be developed by applying diazotized amines and the compound could be acylated yielding valuable coupling components.

The compound is represented by the formula

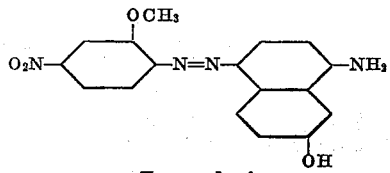

Example 4

The same molecular proportion of 4-chloro-2-amino anisole as used in Example 1 was diazotized and coupled to 17.5 parts of 1,7-amino naphthol by a process similar to that used in Example 1. The solubility of the product was similar to that of the compound of Example 1 and it had affinity for cotton fibres upon which it could be satisfactorily developed with diazotized amines. It was acylated and the acylated products were valuable coupling components and compared favorably with the products of the preceding examples.

The compound is represented by the formula

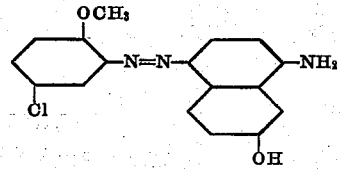

By similar processes the following compounds were made. These compounds had in general the affinity, solubility, coupling and acylating properties of the compound of Example 1.

| Arylamine diazotized | Coupled to— | Formula of product |
|---|---|---|
| Aniline | 1,7-amino-naphthol | ![structure] |
| 4-chloro-2-amino-anisole | do | ![structure] |
| 3-nitro-4-amino-toluene | 2,6-amino-naphthol | ![structure] |
| Do | 1,7-amino-naphthol | ![structure] |
| 4-chloro-2-amino-toluene | do | ![structure] |
| 2,5-dichloro-aniline | do | ![structure] |
| 2-nitro-4-chloro-aniline | do | ![structure] |
| 4-nitro-2-amino-toluene | do | ![structure] |

| Arylamine diazotized | Coupled to— | Formula of product |
|---|---|---|
| 3-nitro-4-amino-toluene | 1,7-amino-naphthol | 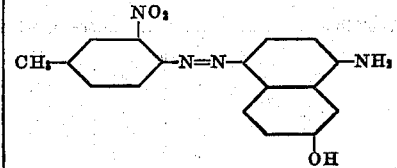 |
| 4-nitro-2-amino-anisole | do | 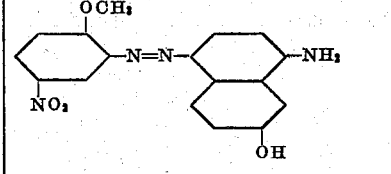 |
| Para-nitro-aniline | do | 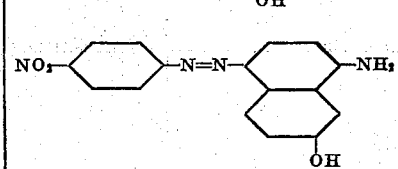 |
| 5-nitro-2-amino-anisole | do | 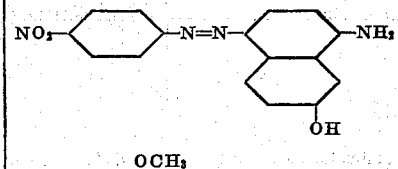 |
| 3-nitro-4-amino-anisole | do | 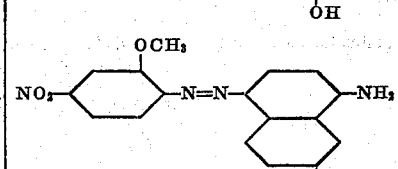 |
| 4-nitro-2,5-dichloro-aniline | do | 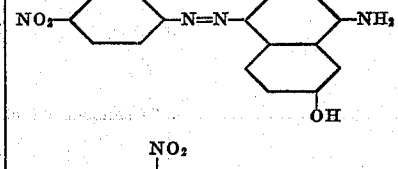 |
| Meta-chloro-aniline | do | 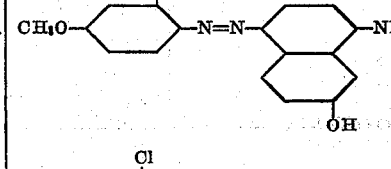 |
| 4-nitro-2,5-diethoxy-aniline | do | 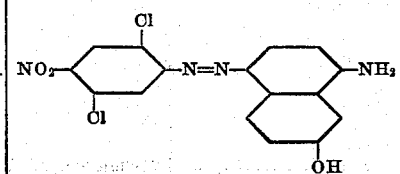 |
| Meta-amino-benzo-trifluoride | do | 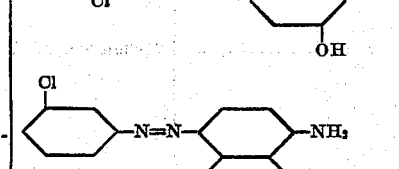 |
| Ortho-phenetidine | do | 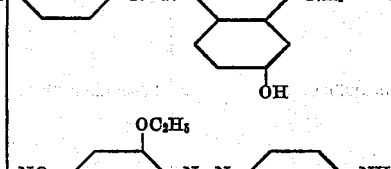 |

| Arylamine diazotized | Coupled to— | Formula of product |
|---|---|---|
| Para-phenetidine | 1,7-amino-naphthol | 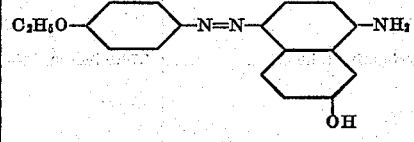 |
| 2,5-dimethoxy-aniline | ......do...... | 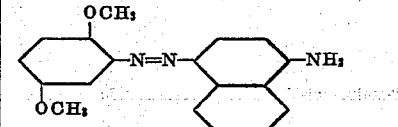 |
| Meta-nitro-aniline | 1,5-amino-naphthol | 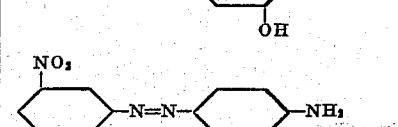 |
| 3-nitro-4-amino-toluene | ......do...... | 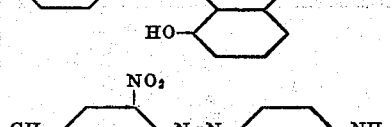 |
| Do | 2,6-amino-naphthol | 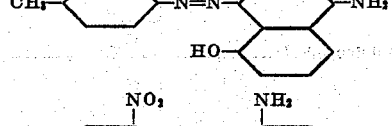 |
| Meta-nitro-aniline | ......do...... | 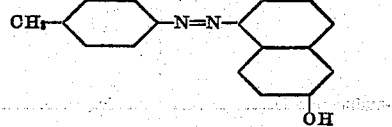 |
| Do | 2,7-amino-naphthol | 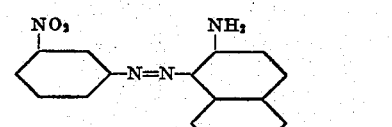 |
| 2,5-dichloro-aniline | 1,6-amino-naphthol | 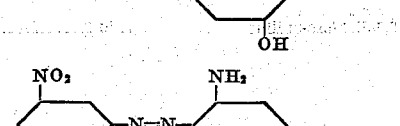 |

The preferred embodiments of the invention are those in which the described coupling components are coupled to one of the diazotized anilines which is substituted once by alkyl, alkoxy, nitro or chloro in the meta or para position to amino, or one of the disubstituted anilines which are substituted in the 2-position by alkyl, alkoxy or chloro and in the 4- or 5-position by one of the group consisting of alkyl, alkoxy, nitro and chloro, such as para-nitraniline, 4-nitro-2-amino toluene, 5-nitro-2-amino toluene, 4-nitro-2-amino anisole, 5-nitro-2-amino anisole, 5-nitro-2-amino anisole, 5-chloro-2-amino toluene, 5-chloro-2-amino anisole, 3-nitro-6-chloro aniline, 4-nitro-2-chloro aniline, 3-chloro aniline, 4-chloro aniline, 2-amino-4-chloro toluene, 2,5-dichlor aniline, 4-chloro aniline, 5-chloro-2-amino toluene, 5-chloro-2-amino anisole and 3,4-dichloro aniline. In the specification and claims alkyl refers to aliphatic groups having not more than two carbons, such as methyl and ethyl, and alkoxy refers to the corresponding alkoxy groups. The preferred coupling component of this group is 1,7-amino naphthol.

Any of the following coupling components may be used to make the compounds of the invention, 1-amino-5-hydroxy naphthalene, 1-amino-6-hydroxy naphthalene, 1-amino-7-hydroxy naphthalene, 2-amino-6-hydroxy naphthalene, 2-amino-7-hydroxy naphthalene and 2-amino-8-hydroxy naphthalene.

As illustrations of other anilines which can be used the following are mentioned, 2-nitro-6-methyl aniline, 2-nitro-6-methoxy aniline, 2,4- dimethyl-6-nitro aniline, 2-nitro-4-methyl-5-chloro aniline, 2-nitro-4-methoxy-5-chloro aniline, 2,4-dinitro aniline and many others, substituted by groups other than water-solubilizing groups.

Since from the foregoing description of the invention it will be apparent to those skilled in the art that various other embodiments of the invention may be made without departing from the spirit and scope thereof, it is to be understood that the invention is not limited to the specific details of the illustrations.

We claim:

1. A compound represented by the formula

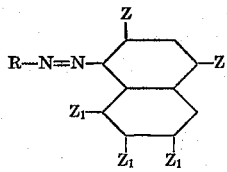

in which one Z is amino and the other is hydrogen; one $Z_1$ is hydroxy and the others are hydrogen; and R is the radical of one of a group consisting of the arylamines represented by the formulae

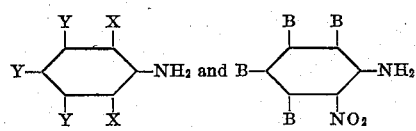

wherein each Y is one of a group consisting of hydrogen, methyl, ethyl, methoxy, ethoxy, chloro and nitro; each X is one of a group consisting of hydrogen, methyl, ethyl, methoxy, ethoxy and chloro; at least one B is from the group consisting of methyl, ethyl, methoxy, ethoxy, chloro and nitro; and the other B's are from the group consisting of hydrogen, methyl, ethyl, methoxy, ethoxy, chloro and nitro.

2. A compound represented by the formula

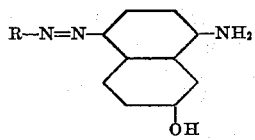

in which R is the radical of one of a group consisting of the arylamines represented by the formulae

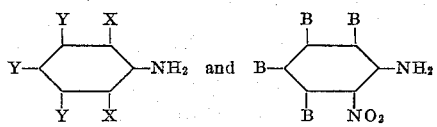

wherein each Y is one of a group consisting of hydrogen, methyl, ethyl, methoxy, ethoxy, chloro and nitro; each X is one of a group consisting of hydrogen, methyl, ethyl, methoxy, ethoxy and chloro; at least one B is from the group consisting of methyl, ethyl, methoxy, ethoxy, chloro and nitro; and the other B's are from the group consisting of hydrogen, methyl, ethyl, methoxy, ethoxy, chloro and nitro.

3. A compound represented by the formula

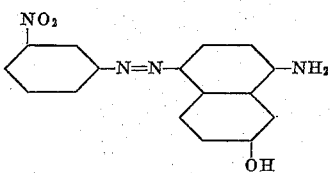

4. A compound represented by the formula

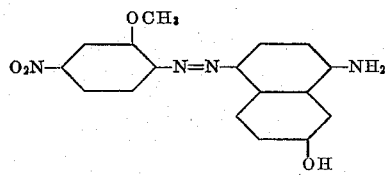

5. A compound represented by the formula

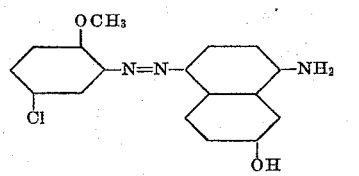

MILES AUGUSTINUS DAHLEN.
FRITHJOF ZWILGMEYER.